United States Patent
Costantino et al.

(10) Patent No.: US 7,401,157 B2
(45) Date of Patent: Jul. 15, 2008

(54) COMBINING SEPARATE INFINIBAND SUBNETS INTO VIRTUAL SUBNETS

(75) Inventors: Lino Costantino, Oakland, CA (US); Howard Green, Carlsbad, CA (US); Brian Forbes, Foster City, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 979 days.

(21) Appl. No.: 10/208,429

(22) Filed: Jul. 30, 2002

(65) Prior Publication Data
US 2004/0024903 A1 Feb. 5, 2004

(51) Int. Cl.
*G06F 15/173* (2006.01)
(52) U.S. Cl. .................................. 709/238; 709/212
(58) Field of Classification Search ......... 709/230–242, 709/212; 710/36–51
See application file for complete search history.

(56) References Cited

U.S. PATENT DOCUMENTS

2002/0165978 A1* 11/2002 Chui ........................ 709/238
2003/0033426 A1* 2/2003 Beukema et al. ............ 709/234
2003/0061379 A1* 3/2003 Craddock et al. ........... 709/238
2003/0188056 A1* 10/2003 Chemudupati ............. 710/51

OTHER PUBLICATIONS

Eddington, C. R.:InfiniBridge: an infiniBand channel adapter with integrated switch, Micro IEEE, vol. 22, Issue 2, Mar.-Apr. 2002, pp. 48-56.*
InfiniBand Trade Association: InfiniBand Architecture Specification vol. 1, Release 1.0.a; (913 p.); Jun. 19, 2001.

* cited by examiner

*Primary Examiner*—Andrew Caldwell
*Assistant Examiner*—John M Frink
(74) *Attorney, Agent, or Firm*—Conley Rose, P.C.

(57) ABSTRACT

A system and method are disclosed for combining physically separate subnets of an Infiniband (IB) network into virtual subnets. In the virtual subnets, all of the end node in one subnet may be allowed to access all of the end nodes in another subnet, or the access may be limited to only a selected subset of another subnet. In addition to processing of globally-routed IB packets, the router also communicates (alone or in cooperation with another router) locally-routed IB packets traveling between a designated end nodes in different subnets. The routers may encapsulate the packets into raw datagrams for transport across intervening subnets. The described system and method may advantageously allow remote end nodes to act as a part of a given subnet, and may advantageously allow routers to provide both switch and routing functionality.

24 Claims, 12 Drawing Sheets

FIG. 2A

| LRH | BTH | ETH | PAYLOAD | ICRC | VCRC |
|---|---|---|---|---|---|
| 8 B | 12 B | 0-28 B | 0-4096 B | 4 B | 2 B |

FIG. 2B

| LRH | GRH | BTH | ETH | PAYLOAD | ICRC | VCRC |
|---|---|---|---|---|---|---|
| 8 B | 40 B | 12 B | 0-28 B | 0-4096 B | 4 B | 2 B |

FIG. 2C

| LRH | RWH | PAYLOAD | VCRC |
|---|---|---|---|
| 8 B | 4 B | 0-4208 B | 2 B |

FIG. 2D

| LRH | GRH | PAYLOAD | VCRC |
|---|---|---|---|
| 8 B | 40 B | 0-4172 B | 2 B |

FIG. 2E

| VL | LVER | SL | RSV | LNH | DID | RSV | PKT LEN | SID |
|---|---|---|---|---|---|---|---|---|
| 4 b | 4 b | 4 b | 2 b | 2 b | 16 b | 5 b | 11 b | 16 b |

FIG. 2F

| IP VERS | TCLASS | FLW LBL | PYLD LEN | NXT HDR | HOP LMT | SGID | DGID |
|---|---|---|---|---|---|---|---|
| 4 b | 8 b | 20 b | 16 b | 8 b | 8 b | 128 b | 128 b |

FIG. 2G

| RSV | ETHTYPE |
|---|---|
| 16 b | 16 b |

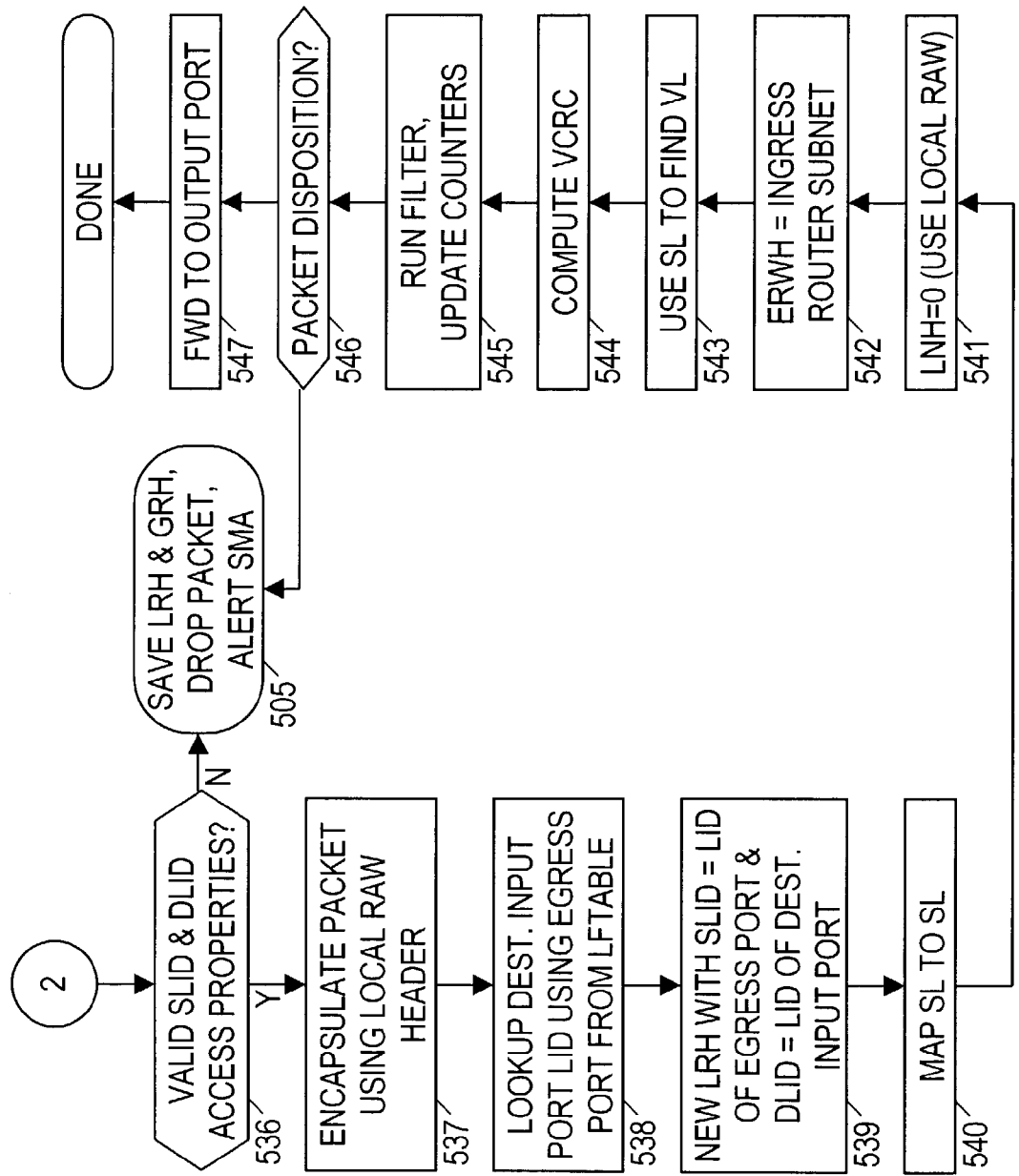

| LRH | RWH | ERWH | ORIGINAL LRH | PAYLOAD | VCRC |
|---|---|---|---|---|---|
| 8 | 4 | 4 | 8 | 16-2158 | 2 |

Original packet spans: ORIGINAL LRH, PAYLOAD, VCRC

FIG. 8A

| LRH | GRH | GRWH | ORIGINAL LRH | PAYLOAD | VCRC |
|---|---|---|---|---|---|
| 8 | 40 | 8 | 8 | 16-2118 | 2 |

Original packet spans: ORIGINAL LRH, PAYLOAD, VCRC

FIG. 8B

COMBINING SEPARATE INFINIBAND SUBNETS INTO VIRTUAL SUBNETS

CROSS-REFERENCE TO RELATED APPLICATIONS

The present application relates to U.S. patent application Nos. 10/208,430 and 10/208,428, now U.S. Pat. Nos. 7,307,996 and 7,221,676.

BACKGROUND

1. Field of the Invention

This invention generally relates to systems and methods for implementing storage area networks. More specifically, this invention relates to a method and apparatus that provides fast and efficient routing between subnets in an Infiniband network. Further, this invention relates to a method and apparatus that couples disjoint subnets into a single logical subnet, and that may provide aliasing of IB ports to facilitate the creation of virtual subnets.

2. Description of Related Art

Internetworking of high-performance computers has become the focus of much attention in the data communications industry. Performance improvements in processors and peripherals, along with the move to distributed architectures such as client/server configurations, have spawned increasingly data-intensive and high-speed networking applications, such as medical imaging, multimedia, and scientific visualization. Various protocols have been developed to provide the necessary communications capacity.

A protocol known as Infiniband can carry data over a given link at rates exceeding 2.5 Gbps in each direction. The Infiniband standard provides a point-to-point, switched architecture that allows many devices to concurrently communicate with high-bandwidth and low latency in a protected, remotely managed environment. An end node can communicate over multiple ports, and multiple communications paths may be used between end nodes. Properly exploited, the multiplicity of ports and paths provide both fault tolerance and increased data transfer bandwidth.

An Infiniband (IB) network interconnects end nodes. Each end node may be a processor node, an I/O unit, and/or a router to another network. The IB network is subdivided into subnets that are interconnected by routers. The subnets comprise subnet managers, switches, and the end nodes linked to the switches. (Technically, a single link between two end nodes is also considered a subnet, with one of the end nodes functioning as a subnet manager for that link. However, this degenerate case is neglected herein.) Multiple links may exist between any two of the devices.

Packets are directed through the IB network using either path-based ("directed route") or destination-based addressing. Directed-route addressing is reserved for subnet management communications, and may be used before the forwarding tables have been initialized in the switches and routers. Directed-route packets include two lists of port numbers that define a path through the subnet. Each list specifies, in order, the output port of each switch along the path. One list specifies the forward route, and the other specifies the reverse route. The packets also include a direction bit to indicate which list is being followed, and a pointer to indicate the current position in the list. The reverse route list is built by the switches as the packet traverses them.

In destination-based addressing, the packets include either a unicast identifier of a single destination end node, or a multicast identifier of a set of destination end nodes. A multicast set can be defined by an end node and used thereafter. The subnet manager configures the switches with routing information to specify all of the ports where a multicast packet needs to travel. Switches receiving a multicast packet will replicate the packet and send it out to each of the designated ports except the arrival port.

In an Infiniband network, communication occurs at two levels: local (intra-subnet) and global (inter-subnet). Each end node has a global identifier (GID) and a shorter, local identifier (LID). For local communications within a given subnet, LIDs are sufficient to identify the source and destination nodes. For communications that pass between subnets, however, GIDs are required. End nodes in a subnet are interconnected by switches that receive and forward packets based on the LIDs. In turn, subnets are interconnected by routers that receive packets and forward the packets based on GIDs.

Unlike switches, the routers must process the packets to replace the source and destination LIDs in the packet with those appropriate for the current subnet. Such processing must occur at astonishing speeds to prevent the router from becoming a bottleneck in the network. Yet, such performance commonly requires unduly expensive hardware. Consumers would benefit from an architecture that provides such performance at an affordable price. Consumers would further benefit if such a router architecture provided additional features such as connecting disjoint subnets into a single virtual subnet, thereby eliminating the need for closely-related end nodes in separate subnets to communicate at the global level. Consumers would yet further benefit from simplification and centralization of network management that the virtual subnet creation would make possible. Such benefits of virtual subnets would be facilitated if routers provided LID aliasing for end nodes in separate subnets.

SUMMARY OF THE INVENTION

Accordingly, there is disclosed herein a system and method for combining physically separate subnets of an Infiniband (IB) network into virtual subnets. In the virtual subnets, all of the end node in one subnet may be allowed to access all of the end nodes in another subnet, or the access may be limited to only a selected subset of another subnet. In a preferred embodiment, the network comprises a first and second set of switch-connected end nodes, and a router that processes globally-routed IB packets traveling between the first and second sets to provide local route headers suitable for a receiving set of switch-connected end nodes. The router also communicates locally-routed IB packets traveling between a first end node in the first set and a second end node in the second set. To communicate the locally-routed packets, the router may emulate one or more switches that connect the second end node to the first set of switch-connected end nodes. The network may further include a second router that cooperates with the first to carry locally-routed IB packets between the sets of switch-connected end nodes. The routers may encapsulate the locally-routed IB packets into raw datagrams for transport across intervening sets of switch-connected end nodes.

The described system and method may advantageously allow remote end nodes to act as a part of a given subnet, and may advantageously allow routers to provide both switch and routing functionality.

BRIEF DESCRIPTION OF THE DRAWINGS

Various aspects of the invention will become apparent upon reading the following detailed description and upon reference to the accompanying drawings in which:

FIGS. 2A-2G show IB packet and field formats;

FIGS. 5A-5F show a flowchart of a preferred routing method for the port interface circuits;

FIGS. 8A-8B show preferred encapsulated packet formats; and

Figure 1:
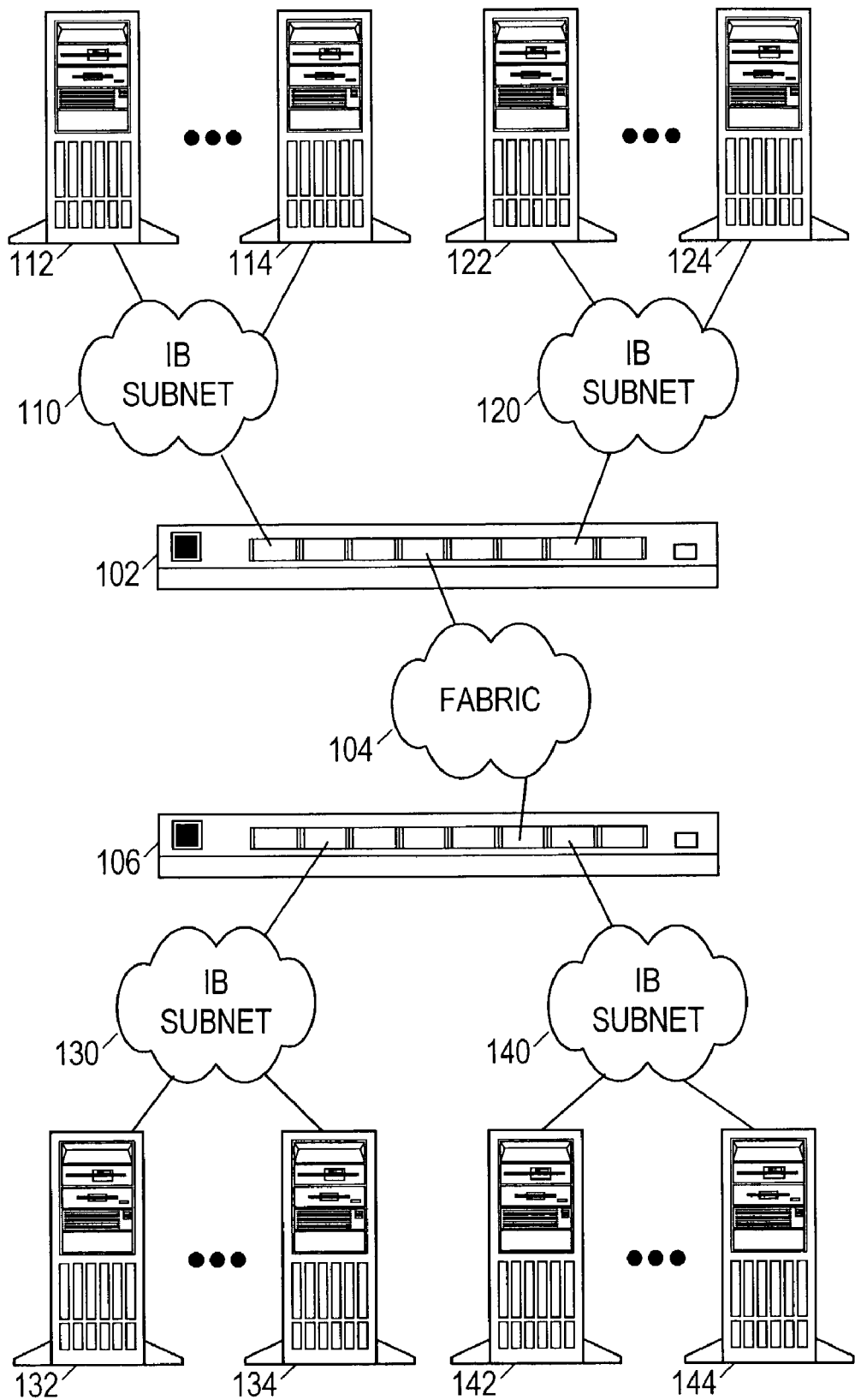
FIG. 1 shows an exemplary Infiniband (IB) network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Network Architecture

Turning now to the figures, FIG. 1 shows an exemplary Infiniband (IB) network. A first router 102 is coupled by a network fabric 104 to a second router 106. Fabric 104 may comprise an IB subnet, or it may comprise some other means of transporting packets between the routers 102, 106 such as a local area network (LAN), a wide area network (WAN), a wireless link, or the Internet. The first router 102 is shown connected by a subnet 110 to end nodes 112-114, and by a subnet 120 to end nodes 122-124. Similarly, the second router 106 is shown connected by a subnet 130 to end nodes 132-134 and by subnet 140 to end nodes 142-144.

In accordance with the Infiniband Architecture Release 1.0a, the processor and I/O nodes are each coupled to the subnets by channel adapters. Each channel adapter may have multiple ports, and each port is assigned a global identifier (GID) and a local identifier (LID). Router ports are also assigned local identifiers, whereas switch ports are not (i.e. they are "transparent" to the original sources of the communication packets). In a preferred network embodiment, router ports may also be assigned global identifiers, i.e. they may simultaneously serve as end nodes and routers.

Each channel adapter port can send and receive concurrently, and packets are channeled through virtual lanes, i.e. parallel buffers with independent flow control. The switches and routers similarly have ports with matching virtual lanes for channeling the packets. Different virtual lanes may be associated with different priorities or transportation classes.

Each channel adapter further includes a subnet management agent that cooperates with the subnet manager. The subnet manager is responsible for configuring and managing switches, routers, and channel adapters, and it can be implemented as part of another device such as a channel adapter or a switch. Multiple subnet managers may be attached to a given subnet, in which case they negotiate to select one as the master subnet manager. The subnet manager discovers the subnet topology, configures each channel port with local identifiers, configures each switch with a forwarding database, assigns service levels to each virtual lane on each link, and maintains a services and end node directory for the subnet.

Packet Structure

In a conventional IB network, end node 112 communicates with end node 114 using a local IB packet such as that shown in FIG. 2A. The local IB packet includes fields for a local route header (LRH), a base transport header (BTH), an conditional extended transport header (ETH), an optional payload, an invariant cyclic redundancy check (ICRC), and a variant cyclic redundancy check (VCRC). Taking these in reverse order, the VCRC is a two-byte redundancy check that covers the entire IB packet. The ICRC is a four byte redundancy check that covers those portions of the packet that should not change as the packet traverses the network (i.e. BTH, ETH, payload, and GRH if there is one). The payload contains the data being transferred. The ETH is present depending on the class of service and the operation specified by the LRH and BTH, respectively. The ETH includes supplementary parameters appropriate to the circumstances, e.g. a total length of a data buffer for an RDMA (remote direct memory access) write operation. The BTH includes fields for the operation (e.g., RDMA write), packet sequence number, partition key, and destination queue.

The LRH is shown in FIG. 2E. It provides the necessary information to the switches for routing the packet, and it is included at the beginning of every packet. The LRH begins with a four-bit field indicating the virtual lane that the packet is traveling on. This field can change from link to link. The next field is a four-bit field that indicates the link version, i.e. the general packet format. The next field is the service level, and the switch uses it to determine which virtual lane to use for this packet. The next field is a 2-bit reserved field, which is ignored. This is followed by a 2-bit "next link header" field that indicates the header following the LRH, i.e. GRH, BTH, RWH, IPv6. The next field is a 16-bit DLID field that specifies the LID of the port to which the subnet delivers the packet. If the packet is to be routed to another subnet, then this is the LID of the router. The DLID field is followed by a 5-bit reserved field, which in turn is followed by an 11-bit packet length field. The packet length field indicates the number of 4-byte words in the packet, excluding only the VCRC field. Finally, the LRH concludes with a 16-bit SLID field containing the LID of the port that injected the packet into the subnet.

Accordingly, the LRH provides the necessary information for routing within the subnet, and the local IB packet of FIG. 2A is sufficient for local communications. However, intersubnet communications require more information, and end node 112 conventionally must use a different packet type to communicate with end node 124 or end node 134. FIG. 2B shows a packet of this type, i.e. a global IB packet. It includes the same fields as the local IB packet, but additionally includes a forty-byte global route header (GRH) that immediately follows the LRH. The GRH provides the necessary information for routers to route the packet between subnets, and is shown in FIG. 2F.

The GHR includes IP Version, TClass, Flow Label, Payload Length, Next Header, Hop Limit, Source GID and Destination GID. The IP Version field indicates the version of the GRH (currently set to six). The TClass field is used to communicate service level end-to-end, i.e. across subnets. The Flow Label field may be used to identify a sequence of packets that must be delivered in order. The Payload Length field indicates the number of bytes, beginning after the GRH and counting up to the VCRC or any zero-padding bytes that precede the VCRC. The Next Header field indicates what header (if any) follows the GRH. The Hop Limit field indicates the number of routers that a packet is allowed to transit before being discarded. The Source GID field identifies the port that injected the packet into the global fabric, and the Destination GID field identifies the final destination port of the packet.

In addition to local IB and global IB packets, the end node 112 may also transmit raw datagrams of two types: Ethertype and IPv6. FIG. 2C shows the Ethertype datagram packet, which includes the raw header (RWH) shown in FIG. 2G. The raw header includes a 16-bit Ethertype field that identifies the transport protocol service data unit contained in the payload. The IPv6 datagram packet is shown in FIG. 2D. Raw datagram packets allow IB networks to carry non-IB transport protocols. The Ethertype datagram packet bridges non-IB communications within the subnet, whereas IPv6 datagram packets will pass through routers.

Router Architecture

Figure 3A:
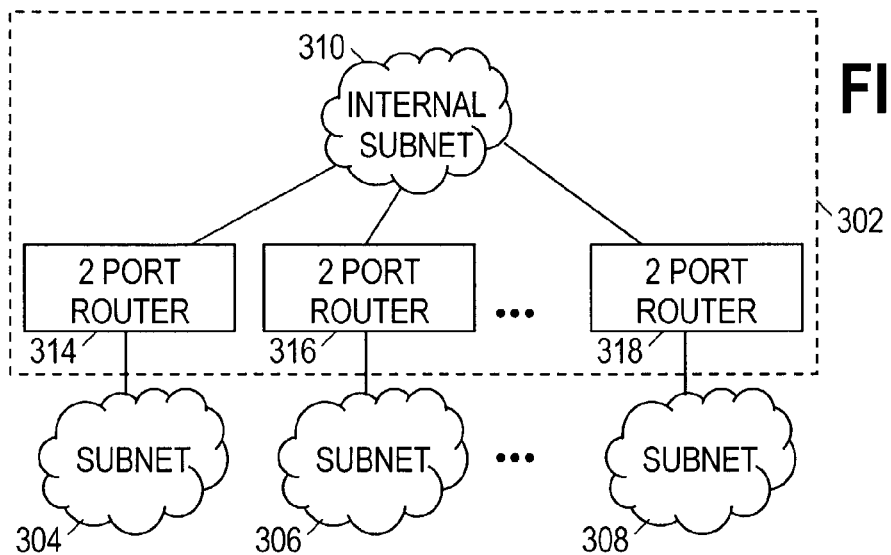
FIGS. 3A-3C show preferred router architecture embodiments.

In the preferred embodiments, IB routers 102, 106 have an internal subnet architecture as shown in FIG. 3A. As shown, a router 302 is coupled to multiple subnets 304-308. Each of the ports of router 302 presents a port interface circuit 314-318, which may be implemented as a two-port router 314-318. These port interface circuits 314-318 are coupled via an internal IB subnet 310. This internal subnet architecture offers high performance and a great deal of versatility.

Figure 3B:
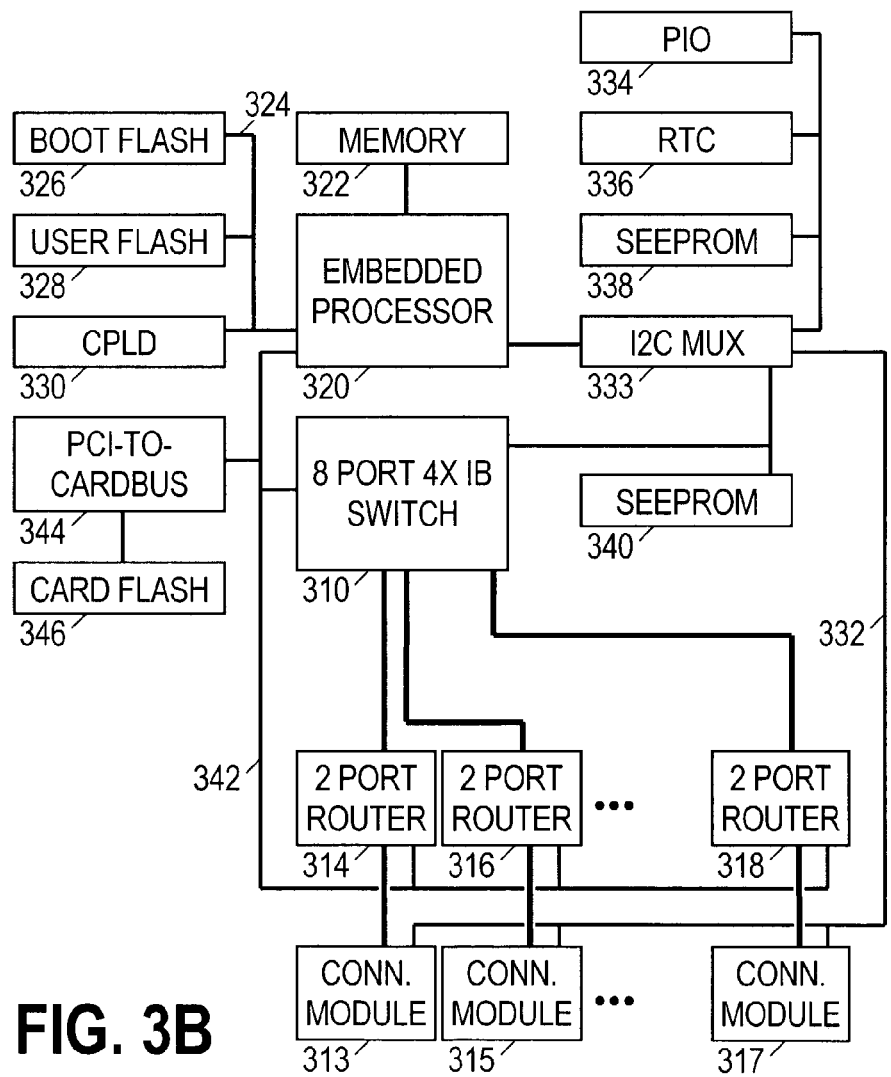

FIG. 3B shows a functional block diagram of preferred embodiment of an 8-port router. The internal subnet is implemented by an 8 port IB switch 310. The port interface circuits 314, 316, 318 are preferably implemented by application-specific integrated circuits (ASICs) described further below. Connection modules 313, 315, 317 are provided for coupling the respective port interface circuits 314, 316, 318 to physical IB links. The connection modules provide the conversions between digital format and the signal format suitable for the physical IB links.

The preferred 8-port router embodiment includes an embedded processor 320 and memory 322 that operate to configure and support the operation of the switch and port interface circuits. A boot bus 324 (such as an industry-standard architecture (ISA) bus) couples the embedded processor 320 to peripherals such as a boot flash memory 326, a user flash memory 328, and a complex programmable logic device (CPLD) 330. These peripherals provide firmware support for embedded processor 320 and initialize the system when power is initially supplied to the router.

A serial bus 332 (such as an I²C bus) couples the embedded processor 320 (preferably via a multiplexer 333) to low-level peripherals such as programmable input/output 334, a real time clock 336, serial electrically erasable programmable read only memories (SEEPROMs) 338, 340, connection modules 313, 315, 317, and a configuration portion of switch 310. The programmable I/O 334 are processor controlled latches generally used to detect switch positions or other user input signals, and used to drive light-emitting diodes or other output means. The real time clock 336 tracks a current date and time, and may be further configured to provide timer and watchdog functions. SEEPROM 338 may be used to store configuration parameters, and SEEPROM 340 may be used to store configuration information for switch 310. The connection modules include status registers and may further include programmable operating parameters that can be accessed via bus 332.

The embedded processor 320 is preferably coupled to the switch 310 and port interface circuits 314, 316, 318 by a PCI (peripheral component interconnect) bus 342. The processor preferably operates as the subnet manager for the switch and port interface circuits, and may further operate as a subnet manager for virtual switches "embedded" in the port interface circuits as described further below. The processor further operates to configure the forwarding tables of the switch and port interface circuits, and provides other standard services described in the IB specification (e.g. general service agents). The processor preferably still further provides error condition handling and performance monitoring.

The PCI bus 342 may further couple the processor to a PCI-to-CardBus bridge 344. The bridge 344 allows the processor to access removable PC Cards 346. Users can easily upgrade the router using such cards, e.g. to add memory, to update software, or to unlock enhanced features.

Figure 3C:
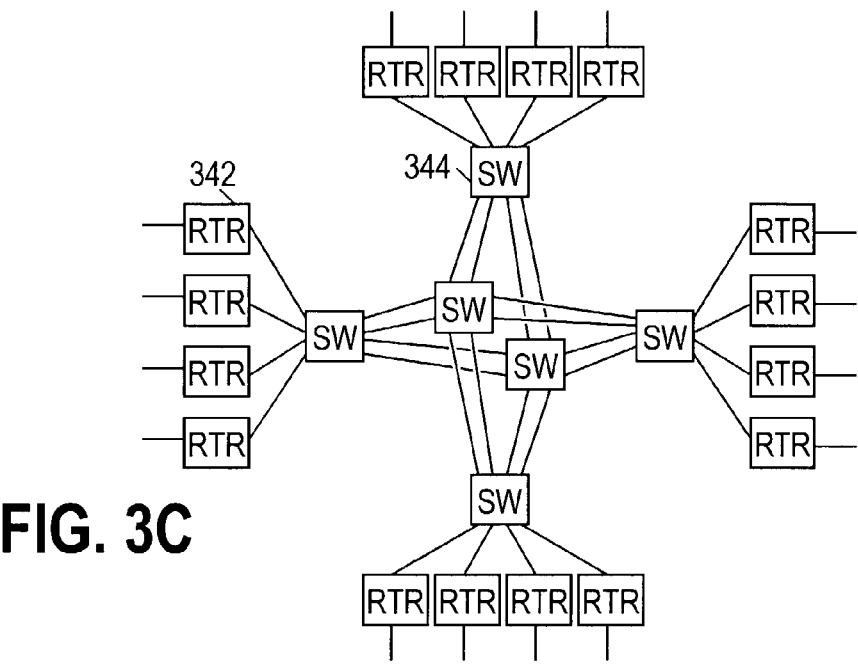

The router in FIG. 3B uses a single switch to implement the internal subnet, but no such limitation is necessary or implied by this. On the contrary, the internal subnet may be implemented as any IB compliant subnet. FIG. 3C shows an exemplary implementation of a sixteen-port router. Each of the sixteen ports has a corresponding port interface circuit (i.e. a two-port router) 342, and the port interface circuits are interconnected by an arrangement of six 8-port switches 344.

Figure 4:
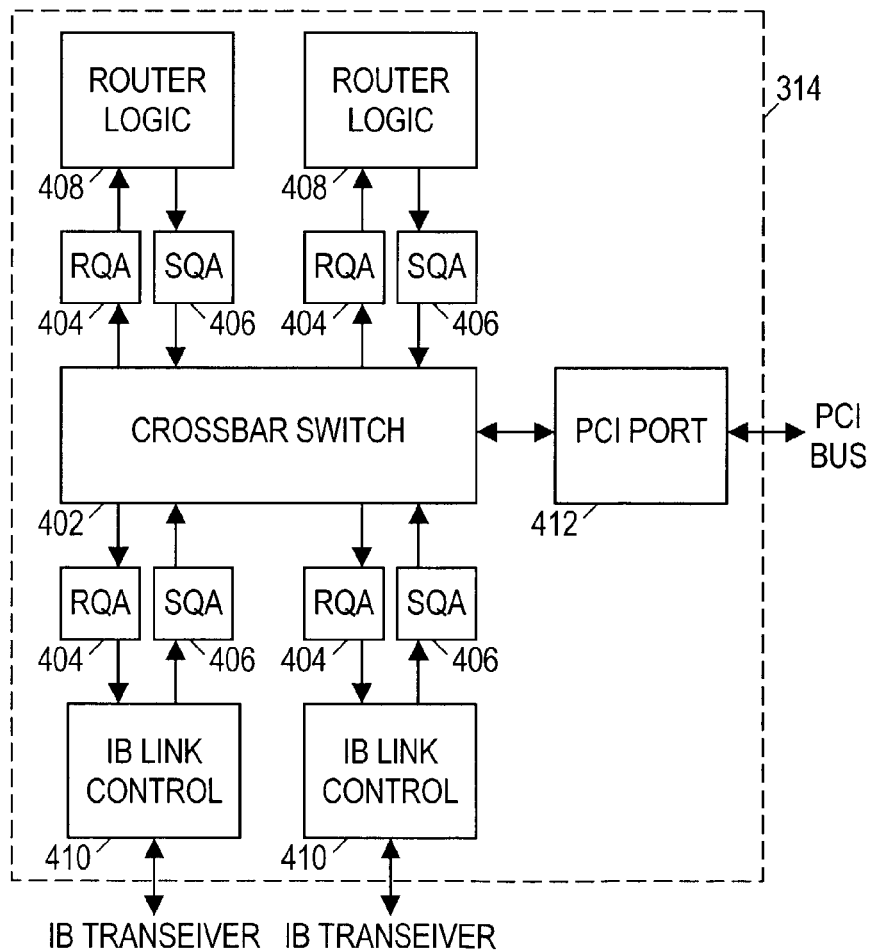
FIG. 4 shows a functional block diagram of a port interface circuit.

FIG. 4 shows a functional block diagram of the preferred embodiment of the port interface circuits 314. The port interface circuits are preferably built around a crossbar switch 402 that routes IB packets between Send Queue Adapters (SQA) 406 and Receive Queue Adapters (RQA) 404. The SQA 406 has an input interface containing eight virtual lanes that can be used to assign buffer credits for packets that are being injected into the switch 402. The input interface of the SQA maps the service level (SL) of the packet to a virtual lane based on an IB-compliant SL-to-VL mapping table. In addition, the SQA calculates ICRC and VCRC fields while sending. The RQA 404 implement an arbitration mechanism in accordance with the IB specification (see vol. 1, chapter 7), and validates the ICRC of incoming packets.

The port interface circuits 314 further include two router logic circuits 408 coupled to respective RQA/SQA pairs. The router logic 408 comprises memory buffers, hardwired buffer controllers and packet header extractors, and embedded RISC processors. The router logic 408 processes the packet headers, determines new packet headers, and routes the outgoing packets to the appropriate IB link control logic 410. The packet header processing performed by the router logic includes key verification, packet filtering, GID to LID conversion, and statistics gathering.

The link control logic 410 receives packets from the IB transceiver (in connection module 313). For these packets, the link control logic 410 performs a DLID lookup to determine which of the two router logic units to send the packet to. By default, the first link control logic sends to the first router logic, and the second control logic sends to the second router logic. The control logic also performs a service level to virtual lane (SL to VL) mapping based on the packet SL and the destination router logic. The packet is then provided to the SQA for delivery to the selected router logic.

A PCI port 412 is provided for interfacing with the PCI bus. The PCI port allows access to the embedded registers, buffers, look-up tables, and memory for data and instruction code for processors embedded in the router logic 408. The PCI port can access these locations directly or by using IB packet communications via the crossbar switch 402.

Operation

FIGS. 5A-5F show a flowchart of a preferred routing method to be performed by router logic 408. Beginning in block 501, the router logic receives a valid IB packet (invalid IB packets are processed separately and discarded). In block 502, the routing logic determines if the DLID is the permissive address (i.e. 0xFFFF), and if so, it further determines whether the SLID is set to an appropriate value in block 503 before forwarding the packet in block 504 to switch port 0 (i.e. the Subnet Manager Agent (SMA) for router 302). If the SLID is not appropriate for a permissively routed packet, then in block 505 the router logic 408 saves the local route header (LRH), discards the rest of the packet, and alerts the SMA.

Recall that the SMA function is performed by embedded processor 320. To forward the packet, the router logic 408 may post an interrupt to the processor, which can then retrieve the packet via the PCI bus 342. Alternatively, the router logic 408 may set a register bit that is periodically polled by the processor, or the router logic 408 may send the packet to a memory-based buffer for the processor. The local route headers (and, if available, the global route headers) of discarded packets may be provided to processor in a similar manner.

Returning to block 502, if the packet is not a permissively routed packet, then in block 506, the router logic determines if the DLID is a multicast address. If so, then the method branches to the multicast process (see FIG. 5F). Otherwise, in block 507, the router logic performs a DLID lookup in the local forwarding tables associated with the input port that received the packet. The local forwarding table maps the LID to a port number and port type. As explained further below with reference to FIG. 7, the router 302 may implement the functionality of multiple IB network units including a router and multiple virtual switches. (Virtual switches are a preferred mechanism for the router to provide a "switched" path between separate portions of a virtual subnet.) Accordingly, the port type may be "router" or "switch".

Next, the results of the input port forwarding table lookup are tested. In block 508, the router logic 408 tests in block 509 to determine if the egress port is port 0 (i.e. a directed-route packet), and if so, the router logic verifies that the original local route header SID and DID are valid for a packet directed to port 0. If so, then in block 510 the router logic forwards the packet to the processor 320, which provides the control functionality of internal switches, virtual switches, and the overall router. If the SID/DID values are not valid, the router logic drops the packet and alerts the processor in block 505.

Figure 5A:
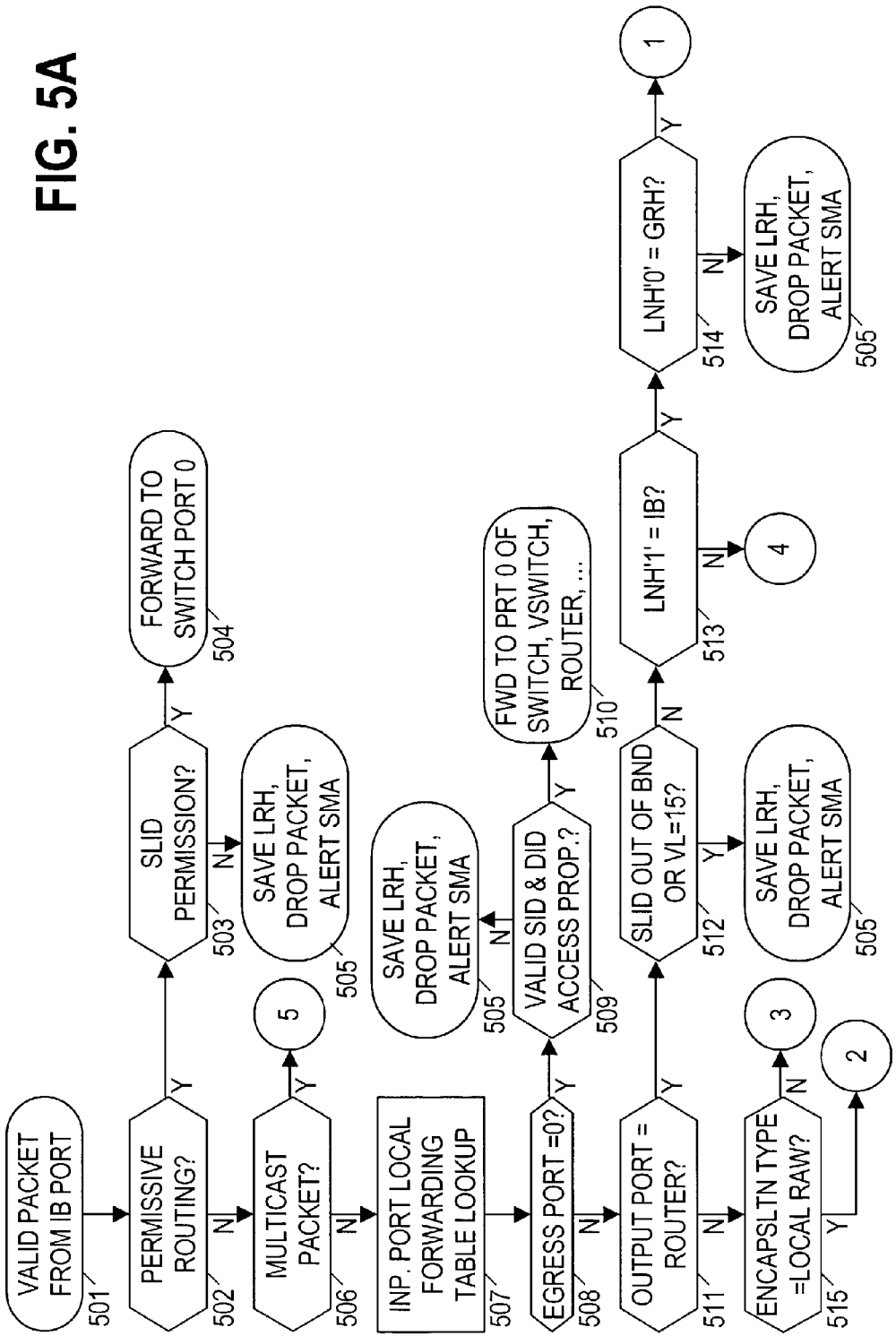
Figure 5B:
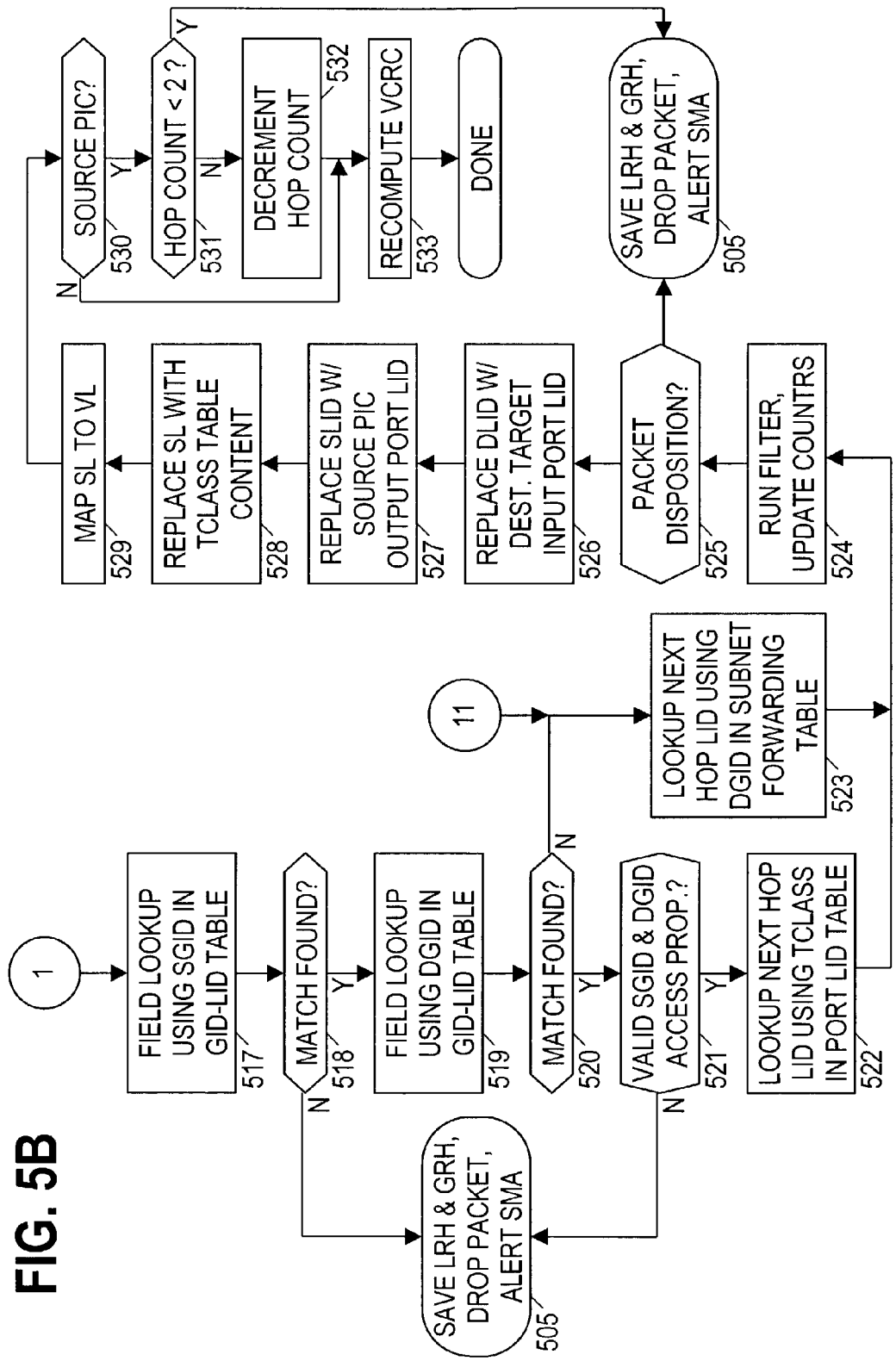

Returning to block 508, if the egress port is not port 0, then in block 511, the router logic 408 tests the output port type. If the output port type is "router", the router logic 408 treats the packet in a conventional fashion, i.e. in block 512 it verifies the validity of the source LID and virtual lane. If either is invalid, the packet is dropped in block 505; otherwise, the router logic determines in block 513 whether the packet has an IB packet format (i.e. FIG. 2A or 2B). If not, then the router logic treats the packet as a raw packet as shown in FIG. 5F. If the packet is an IB packet, then in block 514, the router logic verifies that the packet includes a global route header (i.e. FIG. 2B). If not, the router logic drops the packet and reports an error in block 505. If so, the outer logic operates on the packet as shown in FIG. 5B.

Figure 5D:
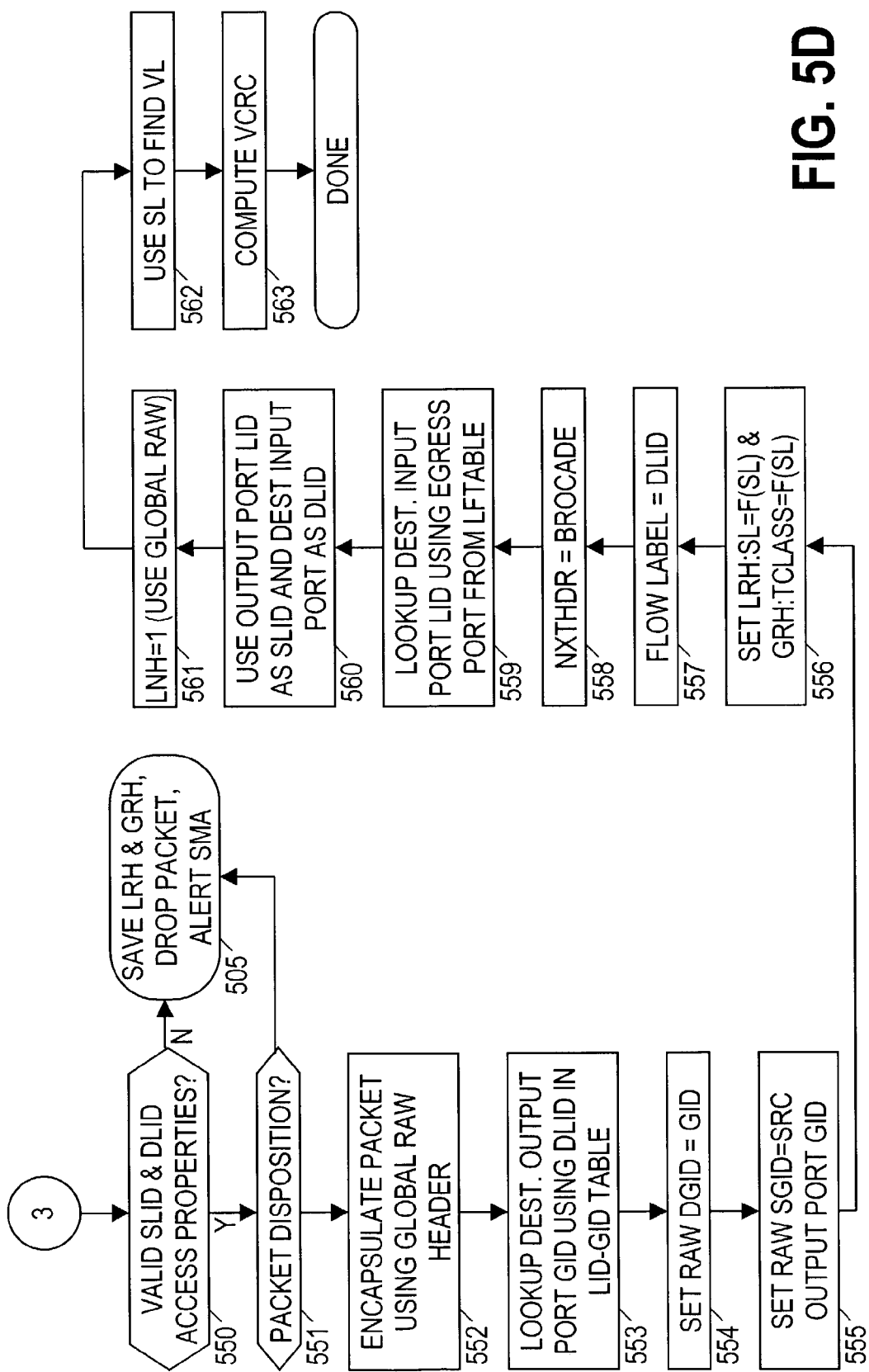

Returning to block 511, if the output port type is not "router", the router logic branches in lock 515 to FIG. 5C or 5D based on the necessary encapsulation type. As described below with reference to the implementation of virtual subnets, the router logic may encapsulate the packet using either of the raw packet formats shown in FIGS. 2C and 2D. One format is suitable for local routing within the router 302, whereas the other format is appropriate for inter-router communication.

Turning now to FIG. 5B, the router logic performs a field lookup using the SGID in block 17. This preferably allows the router logic to implement a fine-grained protection scheme based n the packet's combination of source and destination, and may further allow counting of packets between specific pairs of end nodes to enable accounting for accounting and analysis of bandwidth utilization. In block 518, the router logic tests to determine whether a match was found in the GID-LID table. If not, the packet is dropped in block 505. Otherwise, the router logic performs a GID-LID table lookup using the destination GID in block 519.

Figure 6:
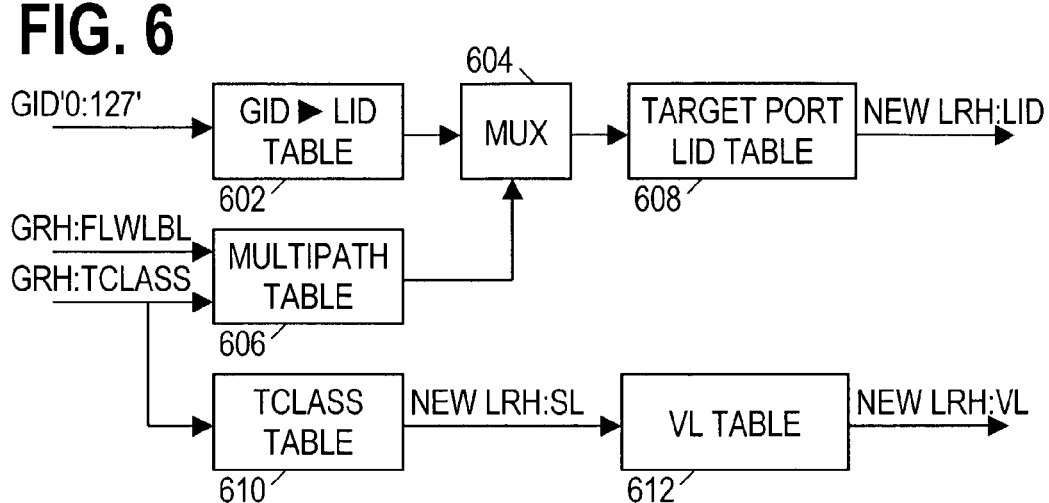
FIG. 6 shows a data flow diagram for a global identifier (GID) to local identifier (LID) conversion.

Referring momentarily to FIG. 6, the lookup proceeds as follows. The destination GID is provided to a "lookup table" 602. This table is preferably implemented as a B-tree search in parallel with a hash table index search to minimize the number of lookups needed. The use of two parallel lookups also allows one to be optimized for exact matches (which usually occur at the final subnet), and the other to be optimized for longest-prefix matches (which usually occur in intermediate routers where a range of addresses is mapped to the exit port of the next subnet). In any event, the output from the lookup table is preferably a set of output ports of router 302 that may be used by the packet to reach the destination GID. In a preferred embodiment, the lookup table holds up to four output ports for each GID. The set of output ports is provided to multiplexer 604, which uses an output signal from multipath table 606 to select one of the output ports. The selected output port is sent to LID table 608 to determine the internal subnet LID of the output port.

The output of multipath table 606 is determined by applying both the Flow Label and the TClass values from the packet's global route header to the table input. This mechanism allows the router to support multiple paths to the desired destination, and the path selection can be based on a software-defined combination of these header values.

The TClass value is further applied to a TClass table 610, which maps the TClass value to a service level for the internal subnet. The service level in turn is applied to a VL table 612 to determine a virtual lane for the packet. These new values (LID, SL, VL) along with the LID of the outgoing link controller 410 are used to build a new local route header that is applied to the IB packet before it is sent over the internal subnet 310. Values for other fields in the new LRH may be obtained in a similar fashion.

Returning to FIG. 5B, the router logic tests the results of the table lookup in block 520 to determine if a match was found. If a match is found, the router logic verifies in block 521 the access properties of the SGID and DGID (e.g. whether they are in the same partition and are allowed to communicate with each other). If the access properties are not valid, the packet is dropped in block 505. Otherwise, in block 522, the TClass is used to determine the LID of the output port as described above with reference to FIG. 6.

If no match is found in block 520, then in block 523, the routing logic uses the destination GID to perform a lookup in a subnet-forwarding table. The forwarding table will provide the internal subnet LID of the appropriate router port to move the packet one hop closer to the subnet containing the packet's ultimate destination. Once the LID has been found, then in block 524 the router logic updates counters (for measuring traffic flow characteristics), and preferably runs one or more filters. Filters are programmable tests that are based on selected packet header fields and that have programmable outcomes (e.g., whether a counter should be incremented, whether a packet should be dropped, whether a packet should be passed to the subnet manager). In block 525, the router logic is given an opportunity to discard the packet if output port limits are being exceeded. (The filters may be used to enforce traffic limits.)

In block 525, the router logic begins building the new local route header by replacing the original destination LID with the LID determined from blocks 522 or 523. In block 527, the original source LID is replaced with the internal subnet LID of the output port from the port interface circuit. In block 528, a new service level value is determined from the TClass value in the original header, and in block 529, this service level used to determine a virtual lane value for the header. The new local route header is now complete.

In block 530, the router logic determines whether the packet is entering the internal subnet from this port interface circuit. If not, i.e. if the packet is exiting router 302 from this port interface circuit, then the router logic recalculates the VCRC value for the packet and the packet is dispatched. If the packet is entering the internal subnet, then the router logic checks the hop count in block 531. If no further hops are allowed the router logic discards the packet; otherwise, the router logic decrements the hop count by one in block 532. The router logic then recalculates the VCRC value for the packet and dispatches the packet.

Thus, FIGS. 5A-5B show a preferred method for routing a global IB packet in a more-or-less normal manner. Before discussing FIGS. 5C-5E, it would be helpful to describe some additional preferred functionality of router 302. It was mentioned in the discussion of FIG. 1 that a conventional IB network requires end node 112 to use global routing to communicate with end node 124 or with end node 134. In a preferred embodiment, however, router 102 also offers the functionality of a switch, thereby allowing physically separate IB subnets 110, 120 to be combined into a single logical subnet (hereafter referred to as a local virtual private subnet). Further, in the preferred embodiment, router 102 cooperates with router 106 to provide the functionality of a switch that allows physically separate IB subnets 110, 130 to be combined into a single logical subnet (hereafter referred to as a remote virtual private subnet).

Figure 7:
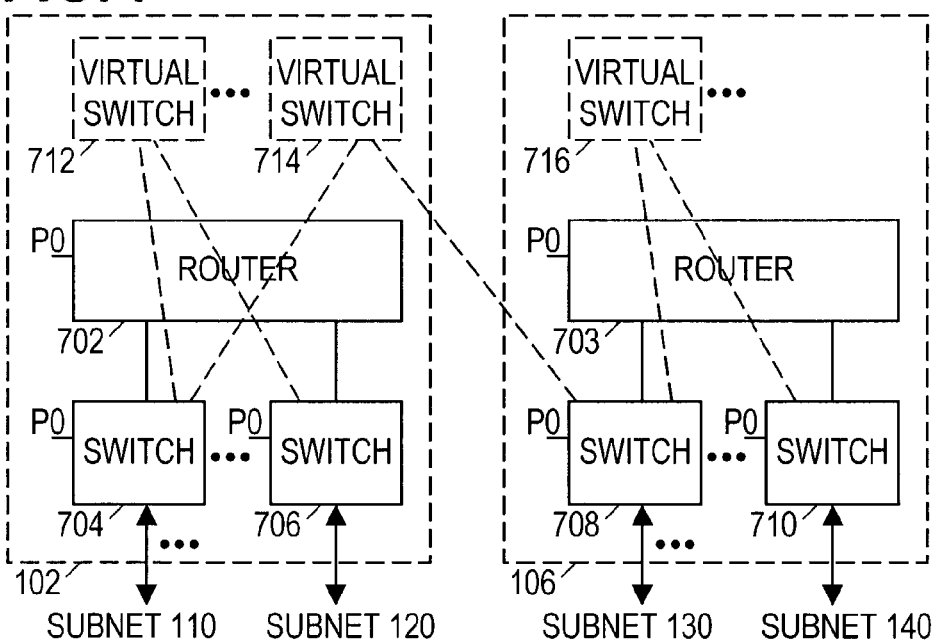
FIG. 7 shows a functional block diagram of router including simulated functional blocks.

FIG. 7 shows a functional block diagram of preferred embodiments of routers 102 and 106 as perceived by IB devices external to the routers. As the subnet manager probes router 102 to discover what subnet 110 is linked to, it encounters a switch 704 emulated by router 102. Further probing reveals to the subnet manager that the switch 704 is coupled only to subnet 110 and to a router 702. The subnet manager does not investigate network topology beyond router 702. Similarly, the subnet manager for subnet 120 finds an emulated switch 706 coupled to a router 702, the subnet manager for subnet 130 finds an emulated switch 708 coupled to a router 703, and the subnet manager for subnet 140 finds an emulated switch 710 coupled to a router 703.

When it is desired to couple subnet 110 to subnet 120, router 102 creates a virtual switch 712 that couples switch 704 to switch 706. (This may be done through appropriate programming of the tables described previously.) Switch 704 notifies the subnet manager for subnet 110 that a connection event has occurred, thereby prompting the subnet manager to explore the topology of the "newly connected" portion of the subnet. Similarly, switch 706 notifies the subnet manager of subnet 120 that a connection event has occurred, thereby prompting the subnet manager to discover the "newly connected" subnet units. If desired, the router 102 can operate as a filter, thereby allowing the subnet 110 access to only selected portions of subnet 120, and vice versa for subnet 120.

Likewise, when it is desired to couple subnet 110 to subnet 130, routers 102 and 103 each create a virtual switch or, more preferably, they cooperate to create a single virtual switch 714. The created virtual switches couple switch 704 to switch 708. As before, switches 704 and 704 notify their respective subnets of a connection event, and the subnet managers of the respective subnets are allowed to "see" past the router into the other subnet.

The above-described technique is not limited to the connection of just two subnets. Rather, a virtual switch can couple together multiple subnets, although locally connected subnets are preferably coupled together by a virtual switch separate from a virtual switch that couples a local subnet to a remote subnet.

Because the virtual switches are not physical, the packets travel through one or more routers to move between the switches that are supposedly connected by the virtual switches. However, the packets that are supposed to be carried by the virtual switches may have only local route headers (LRH) to indicate their source and destination. To preserve the LRH information, the router logic 408 is preferably configured to encapsulate the original packets in a larger packet that travels through the internal subnet. The router logic 408 at the exit port from the subnet can then de-encapsulate the original packet and dispatch it to the destination subnet as if it had moved unchanged across a virtual switch.

The preferred packet encapsulation formats are shown in FIGS. 8A, 8B. For packets traveling within a single router (e.g. between end nodes 112, 124), the packet is preferably encapsulated in a raw datagram Ethertype packet format as shown in FIG. 8A. The original packet has a new local route header prepended, followed by a raw header (RWH) and an extended raw header (ERWH). The original VCRC is replaced by a new VCRC, which is calculated with the new headers included. The local route header directs the packet through the internal subnet to the exit port of the router, and the raw header indicates that the packet encapsulates an original packet. The extended raw header preferably includes a field identifying the originating subnet, and may include a security field to prevent unauthorized use of this feature.

Packets that need to travel through more than one router (e.g. between end nodes 112, 134) are preferably encapsulated in a raw datagram IPv6 packet format as shown in FIG. 8B. The original packet is prepended with a new local route header, a global route header, and a global raw header (GRWH). The local route header directs the packet through the internal subnet to the exit port of the router. The global route header directs the packet from there to the exit port of the target router, and the global raw header indicates that the packet encapsulates an original packet, and may also include a security field to maintain the privacy of the virtual subnet.

Turning now to FIG. 5C, the router logic 408 reaches block 536 if it has determined that a packet is to be encapsulated for the internal subnet only. In block 536, the router logic verifies that the source is allowed access to the targeted destination, and if not, the router logic drops the packet in block 505. Otherwise, in block 537, the router logic begins encapsulation of the original packet in a raw datagram Ethertype packet. To do this, the router logic prepends a raw datagram header and an extended raw header. In block 538, the router logic performs a lookup to determine the internal subnet LID of the appropriate exit port, which will be the new DLID value in the new local route header. In block 539, the new local route header is prepended to the packet, and the SLID value is set to the LID of the input port. The service level value in the original LRH is then used to determine a new service level value for internal subnet travel in block 540. In block 541, the local next header (LNH) value is set to zero to indicate a raw datagram. In block 542, the source subnet value is set for the extended raw header. In block 543, the new service level is used to determine a virtual lane value. The VCRC is then recalculated in block 544. In block 545 the counters are updated and the filters run. In block 546, the router logic decides whether to drop the packet due to excess loading, and in block 547 the encapsulated packet is sent off through the internal subnet.

FIG. 5D is reached if the router logic has determined that a packet is to be encapsulated for inter-router travel. In block 550, the router logic verifies the access properties for the source and destination LID ports. If the access is not allowed, the packet is dropped in block 505. The packet is also dropped if the router logic determines in block 551 that traffic is excessive. In block 552, the router logic begins the encapsulation process by prepending a global raw header. In block 553, the router logic performs a lookup with the DLID to determine the GID of the router that is attached to the destination port.

Figure 9:
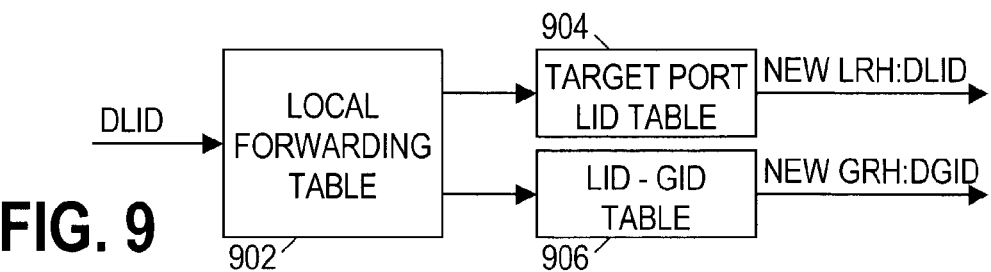
FIG. 9 shows a data flow diagram for a LID to LID conversion.

Turning momentarily to FIG. 9, the lookup procedure is shown. The router logic 408 provides the DLID value to a local forwarding table 902 to obtain two values. One value indicates the router port that the packet should exit from, and this is applied to a target port LID table 904 to determine the internal subnet LID for the corresponding port interface circuit. The internal subnet LID will be the destination LID value in the new local route header. The second value is an index into the LID-GID table 906. The router logic can determine the GID of the destination router by applying the index to the LID-GID table 906.

Returning to FIG. 5D, the router logic in block 554 sets the destination GID value in the new global route header with the GID from the lookup in block 553. In block 555, the source GID value is set to the GID of the current port interface circuit 314. In block 556, the service level value for the new local route header and the TClass value for the global route header are determined as functions of the original service level value. In block 557, the Flow Label is set equal to the DGID value, and in block 558, the next header value is set to indicate a custom header format. In block 559, the internal subnet LID of the destination port is determined in accordance with FIG. 9. In block 560, the LRH is prepended to the packet with the LID of the current port interface circuit used as the source LID, and the DLID value from the lookup. In block 561, the local next header value is set to indicate that the packet is an IPv6 raw datagram. In block 562, the virtual lane is determined, and in block 563, the VCRC is recomputed.

Figure 5E:
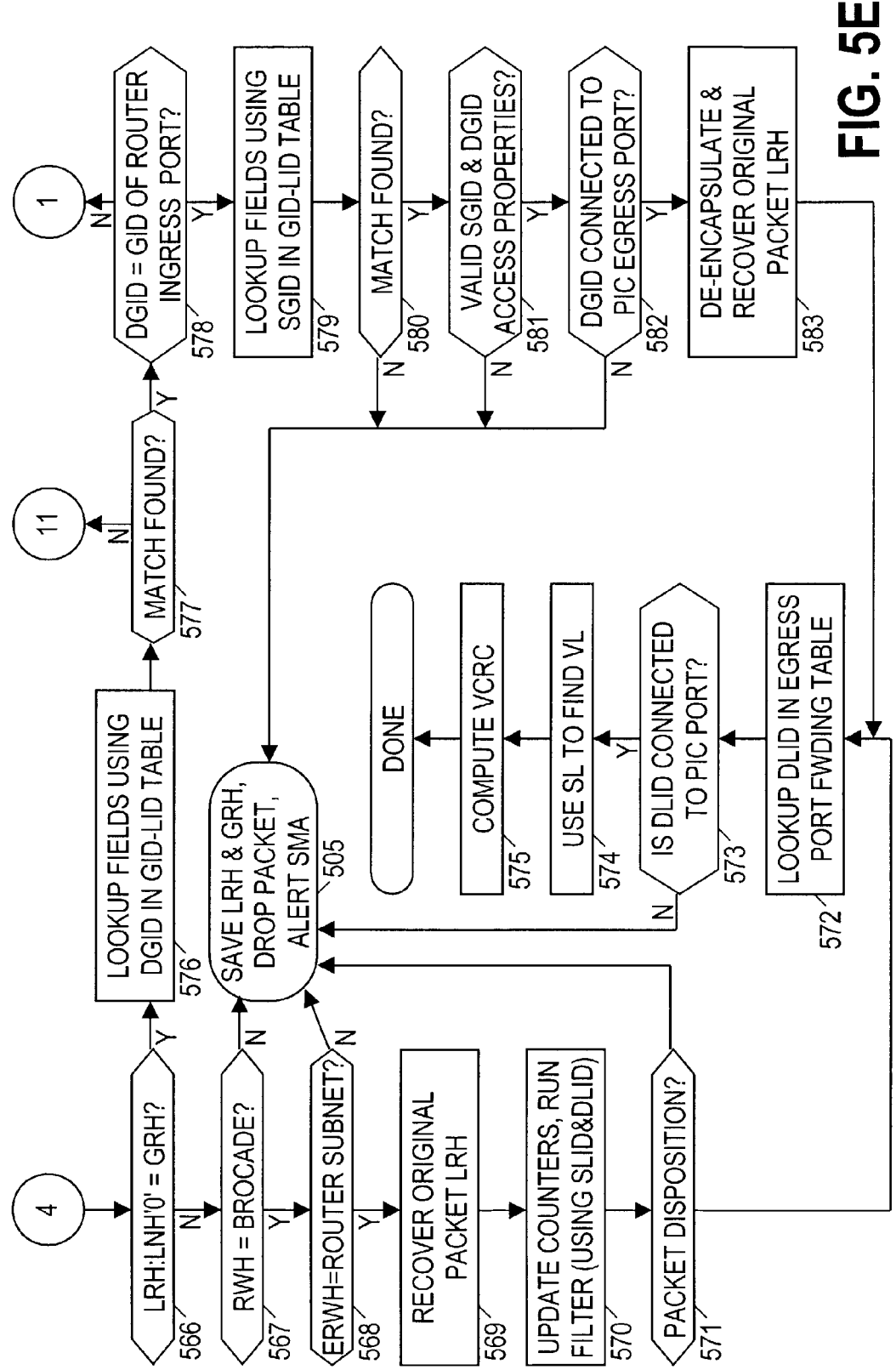
Figure 5F:
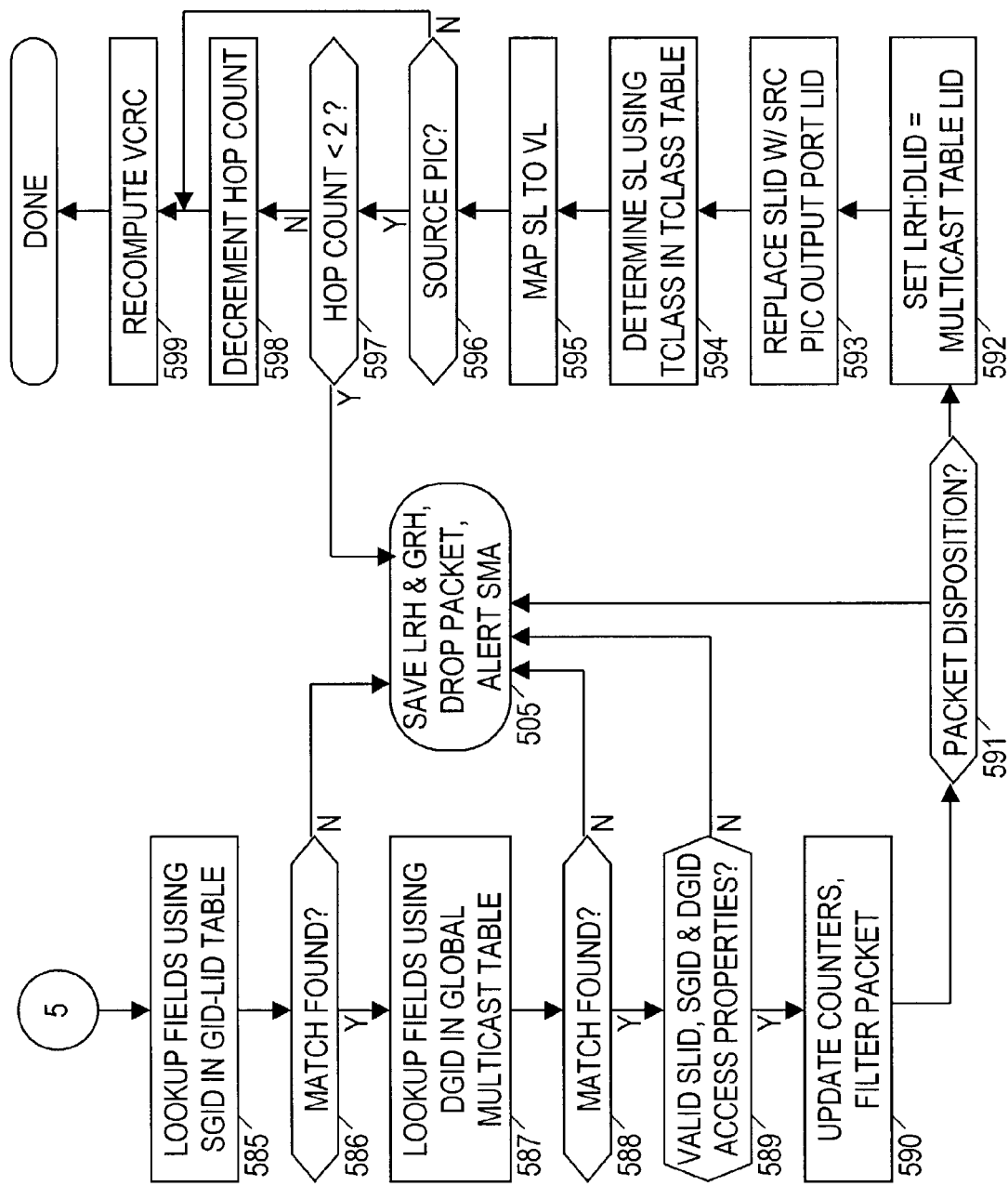

The router logic reaches FIG. 5E for all non-IB packets (i.e. for raw datagrams). In block 566, the router logic tests to determine if the packet is an IPv6 datagram. If not, the router logic tests to determine if the packet is an encapsulated packet by first checking in block 567 whether the packet has the custom header format, and by then checking whether the extended raw header identifies the subnet attached to the port interface circuit. If not, the packet is dropped in block 505. Otherwise, the original packet is de-encapsulated in block 569. In block 570, the counters are updated and the filters run. In block 571, the router logic may determine that the packet should be dropped if there is too much traffic, and if so, the packet is dropped in block 505.

In block 572, the router logic performs a lookup in the outgoing forwarding table to verify that the destination LID is in the external subnet connected to the port interface circuit. In block 573, the router logic verifies that the target is so connected, and if not, the router logic drops the packet in block 505. Otherwise, the router logic uses the service level value to determine the virtual lane in block 574, and in block 575, the router logic recalculates the VCRC value.

Returning to block 566, if the packet is an IPv6 datagram, then in block 576 the router logic performs a lookup in the GID-LID table using the destination GID. In block 577, the router logic determines if a match was found, and if not, the procedure moves to block 523 (FIG. 5B) to do a lookup for the next hop. Otherwise, the router logic tests the DGID value to determine if it equals the GID value of the port interface circuit in block 578. If not, the procedure moves to block 517 (FIG. 5B) to test the SGID value. Otherwise, the router logic performs a series of tests before de-encapsulating the packet.

In block 579, the router logic performs a lookup in the GID-LID table using the SGID value. In block 580, the router logic verifies that a match was found. In block 581, the router logic verifies that the access properties are valid, and in block 582, the router logic verifies that the target of the original packet is in the subnet attached to the port interface circuit. The router logic drops the packet if any of these tests fail; otherwise, it de-encapsulates the packet in block 583, and proceeds to block 572.

The router logic reaches FIG. 5F for multicast packets. In blocks 585, 586, the router logic performs a lookup using the SGID in the GID-LID table and verifies that a match is found. In block 587, 588, the router logic performs a lookup using the DGID in the global multicast table and verifies that a match is found. In block 589, the router logic verifies that the access properties are valid, and in block 590, the router logic updates the counters and runs the filters. In block 591, the router logic chooses whether to retain the packet in view of the traffic load, and in block 592, the router logic sets the destination LID to a multicast value. In block 593, the source LID value in the local route header is set to the LID of output port of the port interface circuit. In block 594, a service level is determined from the TClass value, and in block 595, that service level is used to determine a virtual lane. In block 596, the router logic determines whether the port interface circuit is the one through which the multicast packet is entering the router, and if so, then in blocks 597, 598 the router logic verifies and decrements the hop count value. In block 599, the VCRC is recalculated.

To permit the routing of local packets within the router (i.e. encapsulation), the routers preferably advertise a maximum transfer unit (MTU) size that is smaller than what is internally supported. This to enable the encapsulation of local packets, within RAW local packets. These packets are routed to the final router port in a RAW format, and de-encapsulated by the target router port, before injecting the packet into the subnet.

Aliasing

Thus, the above-described routing method provides for the connection of physically separate subnets into a single virtual subnet. In a traditional subnet, one subnet manager is selected as a master subnet manager, and it coordinates the configuring of the subnet. While the router preferably supports this model, the master subnet manager has to operate on the remote subnet via the router, which may cause an undesired amount of management traffic flow through the router. Further, there may be circumstances in which it is desired to make only a portion of the remote subnet part of the virtual subnet.

Accordingly, a preferred model is also supported in which each physical subnet is managed by a subnet manager that is attached to that subnet. When the router connects a remote subnet (e.g. subnet 120) or a portion thereof to a given subnet (e.g. subnet 110), the subnet manager for subnet 110 "configures" the devices made visible to subnet 110. Part of the configuration process is the assignment of local identifiers (LIDs), which are likely to be different from the LIDs assigned to the devices by the subnet manager for subnet 120.

The reverse is also true, in that the subnet manager for subnet 120 assigns LIDs to the accessible devices in subnet 110, and those LIDs are typically different from the LIDs assigned by the subnet manager for subnet 110.

The router 102 preferably supports this behavior through the use of LID re-mapping. The router logic in a port interface circuit receives a packet from subnet 110 that is addressed to the subnet 110 LID for a device in a remote subnet. The router logic determines that the packet needs to be encapsulated, and determines that the destination LID needs to be changed to the remote subnet LID for the targeted device. The router logic performs this change to the original local route header. For local raw datagram encapsulation, the packet is then encapsulated, and a field is included in the extended raw header to provide the GID of the end node that originated the packet (LRH:SLID). The port interface circuit that receives the encapsulated packet de-encapsulates the packet and determines the appropriate source LID value for the remote subnet.

For IPv6 datagram encapsulation, the port interface circuit that receives a packet addressed to a LID of a remote subnet replaces both the destination LID and source LID fields with appropriate values for the remote subnet. The packet is then encapsulated and transmitted as before (see FIG. 5D).

LID remapping allows a single end node (or a set of end nodes if desired) to be virtually included in a given subnet. This may advantageously simplify communications between that node and the given subnet, and may further provide a means of limiting access by end nodes in the given subnet to other end nodes in the remote subnet.

Numerous variations and modifications will become apparent to those skilled in the art once the above disclosure is fully appreciated. It is intended that the following claims be interpreted to embrace all such variations and modifications.

What is claimed is:

1. A network that comprises:
   a first set of switch-connected end nodes;
   a second set of different switch-connected end nodes; and
   a router configured to process globally-routed Infiniband packets traveling between the first and second sets by providing local route headers suitable for a receiving set of switch-connected end nodes,
   wherein the router is further configured to communicate locally-routed Infiniband packets traveling between a first end node in the first set and a second end node in the second set, and
   wherein the locally routed Infiniband packets as delivered to the router do not contain global routing header information.

2. The network of claim 1, wherein the router is configured to emulate one or more switches that connect the second end node to the first set of switch-connected end nodes.

3. The network of claim 1, wherein the router is configured to emulate one or more switches that connect a selected subset of end nodes from the second set of switch-connected end nodes to the first set of switch-connected end nodes.

4. The network of claim 1, wherein the router is configured to emulate a switch for each router port, and wherein the router is further configured to emulate a switch that connects the emulated router port switches corresponding to the ports that connect to the first and second sets of switch-connected end nodes.

5. The network of claim 1, wherein the router includes an internal subnet configured to transport Infiniband packets between the router ports based on contents of the local route headers (LRH) in the packets.

6. The network of claim 5, wherein a first router port encapsulates locally-routed Infiniband packets directed from the first set of switch connected end nodes to the second end node, wherein the encapsulated packets are raw datagram packets with local route headers, and wherein the internal subnet transports the raw datagram packets to a second router port that de-encapsulates the locally-routed Infiniband packets and provides the de-encapsulated locally-routed Infiniband packets to the second set of switch-connected end nodes.

7. The network of claim 1, wherein the router is configured to couple physically separate subnets into a single logical subnet that is configured by a single master subnet manager.

8. The network of claim 1, further comprising:
   a second router attached to the second set of switch-connected end nodes,
   wherein the first router is attached to the first set of switch-connected end nodes, and
   wherein the second router is configured to cooperate with the first router to communicated locally-routed Infiniband packets traveling between the first and second end-nodes.

9. The network of claim 8, wherein the routers are configured to emulate a switch for each router port, and wherein the routers are further configured to emulate a switch that connects the emulated router port switches corresponding to the router ports that connect to the first and second sets of switch-connected end nodes.

10. The network of claim 8, wherein the routers are configured to emulate one or more switches that connect a selected subset of end nodes from the second set of switch-connected end nodes to the first set of switch-connected end nodes.

11. The network of claim 8, wherein the first router encapsulates locally-routed Infiniband packets directed from the first set of switch connected end nodes to the second end node, wherein the encapsulated packets are raw datagram packets with global route headers, and wherein the first router directs the raw datagram packets to the second router, which de-encapsulates the locally-routed Infiniband packets and provides the de-encapsulated locally-routed Infiniband packets to the second set of switch-connected end nodes.

12. The network of claim 8, wherein the routers are configured to couple physically separate subnets into a single logical subnet.

13. A method of connecting a first Infiniband subnet to a second Infiniband subnet, wherein the method comprises configuring a router for:
   receiving globally-routed packets from the first Infiniband subnet;
   processing the globally-routed packets to provide local route headers suitable for the second Infiniband subnet;
   receiving locally-routed packets without global routing header information from the first Infiniband subnet that are directed to an end node in the second Infiniband subnet; and
   delivering the locally-routed packets to the second Infiniband subnet.

14. The method of claim 13, further comprising configuring the router for:
   emulating one or more switches that connect the end node in the second Infiniband subnet to the first Infiniband subnet.

15. The method of claim 13, further comprising configuring the router for:
   emulating one or more switches that connect a selected subset of end nodes in the second Infiniband subnet to the first Infiniband subnet.

16. The method of claim 13, further comprising configuring the router for:
- encapsulating locally-routed packets into raw datagrams for transport over any Infiniband subnets between the first and second Infiniband subnets; and
- de-encapsulating the locally-routed packets before providing the locally-routed packets to the second Infiniband subnet.

17. The method of claim 13, further comprising configuring the router for:
- combining the first and second Infiniband subnets into a single logical subnet.

18. The method of claim 13, further comprising configuring the router for:
- receiving globally-routed packets from the second Infiniband subnet;
- processing the globally-routed packets to provide local route headers suitable for the first Infiniband subnet;
- receiving locally-routed packets from the second Infiniband subnet that are directed to an end node in the first Infiniband subnet; and
- delivering the locally-routed packets to the first Infiniband subnet.

19. A method of connecting a first Infiniband subnet to a second Infiniband sublet, wherein the method comprises:
- receiving locally-routed packets without global routing header information from the first Infiniband subnet that are directed to an end node in the second Infiniband subnet;
- encapsulating the locally-routed packets in raw datagrams;
- communicating the raw datagrams across a third Infiniband subnet;
- de-encapsulating the locally-routed packets; and
- providing the locally-routed packets to the second Infiniband subnet.

20. The method of claim 19, wherein the encapsulating includes:
- prepending a new local route header, a raw header, and an extended raw header to the locally-routed packet; and
- recalculating the variable cyclic redundancy code value with the prepended headers.

21. The method of claim 19, wherein the encapsulating includes:
- prepending a new local route header, a global route header, and a global raw header to the locally-routed packet; and
- recalculating the variable cyclic redundancy code value with the prepended headers.

22. A router that comprises:
- multiple port interface circuits coupled to corresponding Infiniband subnets; and
- an internal Infiniband subnet that couples the multiple port interface circuits together,
- wherein a first port interface circuit is configured to receive locally-routed packets without global routing header information from a first Infiniband subnet that are directed to an end node in a second Infiniband subnet,
- wherein the first port interface circuit is configured to encapsulate the locally-routed packets in raw datagrams that the internal Infiniband subnet transports to a second port interface circuit, and
- wherein the second port interface circuit is configured to de-encapsulate the locally-routed packets and provide them to the second Infiniband subnet.

23. The method of claim 22, wherein the first port interface circuit is configured to encapsulate by:
- prepending a new local route header, a raw header, and an extended raw header to the locally-routed packet; and
- recalculating the variable cyclic redundancy code value with the prepended headers.

24. The method of claim 22, wherein the first port interface circuit is configured to encapsulate by:
- prepending a new local route header, a global route header, and a global raw header to the locally-routed packet; and
- recalculating the variable cyclic redundancy code value with the prepended headers.

* * * * *